Oct. 18, 1932.　　　W. F. EAMES　　　1,882,787
MOTOR CONTROL SYSTEM
Original Filed April 18, 1930
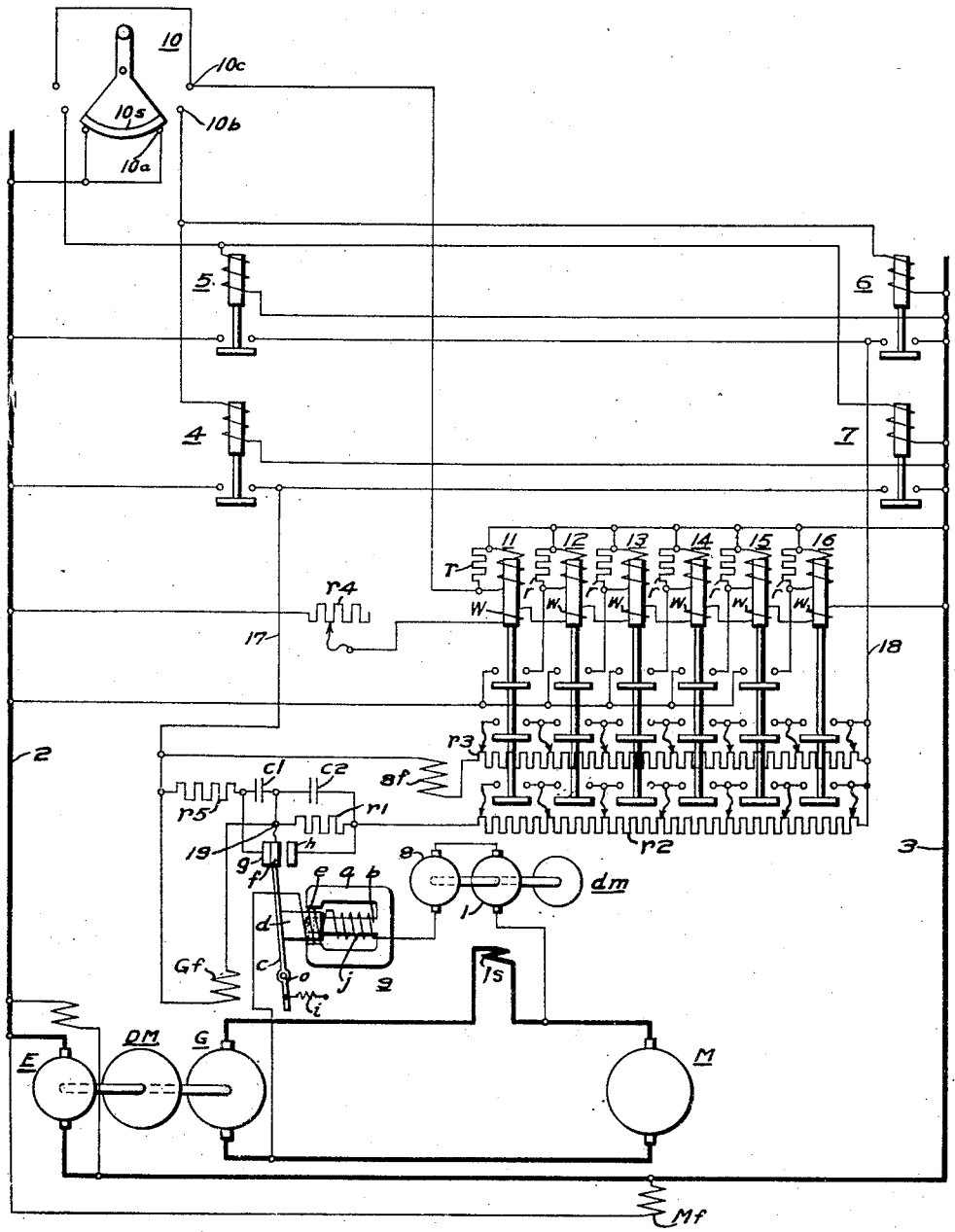
INVENTOR
William F. Eames.
BY
*(signature)*
ATTORNEY Patented Oct. 18, 1932

1,882,787

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR-CONTROL SYSTEM

Application filed April 18, 1930, Serial No. 445,303. Renewed February 11, 1932.

My invention relates to motor-control systems and has particular relation to motor-control systems of the variable-voltage or Ward Leonard type.

In such systems, the armature of a separately excited motor is connected in a loop circuit with the armature of a separately excited, variable-voltage generator; the speed of the motor being determined by the generator excitation. Such an arrangement permits operation of the motor at any speed within a wide range; each speed corresponding to a particular value of generator field current, the operating characteristics of the motor at each speed being similar to those of a shunt motor. Reversing switches may be provided in any suitable circuit of the system, preferably in the generator field circuit, where reversal of the direction of motor rotation is required.

In such systems, as ordinarily constructed and operated, the motor is accelerated by short-circuiting steps of resistance in the generator separately-excited field circuit and decelerated by re-inserting the steps of resistance; the time constant of the generator separately-excited field circuit being relied upon to determine the rate of change of generator excitation, and hence, of motor speed, during both acceleration and deceleration. A cumulative series field winding on the generator or other compounding means acting on the generator is commonly provided for so correcting the regulation of the system as to maintain the motor speed constant, regardless of load.

Such systems are reliable and satisfactory for many purposes but have the disadvantage that the whole period of acceleration or deceleration of the motor cannot be adjusted over as great a range as desirable and the periods of acceleration or deceleration between fractional speeds cannot be conveniently adjusted because of the difficulty in changing the time constant of the generator separately-excited field.

In my co-pending application, Serial No. 445,304, filed April 18, 1930, I have disclosed an arrangement which avoids the above-mentioned difficulties by the use of field-forcing resistors for accelerating the response of the generator field, the field-forcing resistor being controlled by a regulator that is responsive to the motor counter-electromotive force; the regulator acting to maintain the motor counter-electromotive force constant.

In the above-mentioned application, the motor counter-electromotive force is measured as the algebraic sum of the motor terminal voltage and a voltage equal to the motor-armature IR drop, the latter voltage being produced by a small correction generator excited in accordance with the motor current. The voltage impressed on the coils of the regulator is equal to the difference between the motor terminal voltage and the voltage of the correction generator when the direction of power flow in the main armature circuit is toward the motor and is equal to the sum of these voltages when the direction of power flow in the main armature circuit is toward the main generator.

The regulator coils thus receive a voltage at all times equal to the motor counter-electromotive force, regardless of the value or direction of motor current.

A resistor in series with the regulator coils is controlled by means of a plurality of adjustable time-element relays, to thereby change the proportionality between the motor counter-electromotive force and the current in the regulator coils, hence, changing the motor speed. By adjusting the time elements of the relays and the proportion of the resistor controlled by each, the motor-acceleration characteristics may be adjusted with accuracy to conform to any desired time-speed curve.

While the arrangement disclosed in the above-mentioned application possesses great flexibility of adjustment, maintains accurate motor-speed regulation, regardless of load, and is otherwise reliable and satisfactory, it is limited in its application to systems in which the motor counter-electromotive force exceeds a pre-determined minimum. This minimum corresponds to the lowest voltage which will produce the value of current in the regulator coils necessary for proper operation of the regulator.

It is, accordingly, an object of my invention to provide a motor-control system of the variable-voltage type in which the motor acceleration and deceleration characteristics are independent of load and may be adjusted to conform to any desired speed-time curve, and in which the minimum motor speed may be fixed at any desired value.

Another object of my invention is to provide a motor-control system of the variable-voltage type in which the motor acceleration and deceleration characteristics are determined by a regulator acting on the main generator and controlled in accordance with the voltage of an auxiliary generator; each adjustment of the voltage of the auxiliary generator serving to fix the speed of the motor at a value corresponding to the voltage of the regulator, regardless of the load on the motor, the power for operating the regulator being derived from the auxiliary generator.

According to the present invention, I employ field-forcing resistors for accelerating the response of the generator field, and control the field-forcing resistors by a regulator responsive to the difference between a pre-determined control voltage and the motor counter-electromotive force; the regulator being arranged to maintain this difference at a pre-determined value.

As in my co-pending application, mentioned above, I measure the motor counter-electromotive force as the algebraic sum of the motor terminal voltage and a correction voltage equal to the motor IR drop; the correction voltage being produced by a small IR correction generator. I produce the pre-determined control voltage by means of a small separately-excited auxiliary generator. The voltage impressed on the regulator coils is thus the control voltage plus the IR correction voltage minus the motor terminal voltage when the direction of power flow is toward the motor; and is the control voltage, minus the IR correction voltage, minus the motor terminal voltage when the direction of power flow is from the motor.

For example, if the motor-armature resistance is .14 ohms, the control voltage 260 volts, and the voltage at which the regulator responds 20 volts; for a 100 amp. motoring load, the motor IR drop is 14 volts, the correction voltage is 14 volts, the motor terminal voltage 254 volts and the motor counter-electromotive force 240 volts. The voltage impressed on the regulator coils is thus 260+14−254=20 volts. For a 50 amp. overhauling load, the motor IR drop is 7 volts, the correction voltage 7 volts, the motor terminal voltage 233 volts and the motor counter-electromotive force 240 volts. The voltage impressed on the regulator coils is then 260−7−233=20 volts. The above numerical values are given by way of illustration only, the invention being applicable to systems in which widely different values obtain.

It will be noted that, in the present arrangement, the motor counter-electromotive force is fixed by the control voltage, being maintained constant, regardless of load, and the motor speed being consequently maintained constant, regardless of load. The direction of power in the regulator-coil circuit is opposite to that in the arrangement disclosed in my co-pending application, mentioned above, the power for operating the regulator in the present application being obtained from the auxiliary generator.

By varying the control voltage generated by the auxiliary generator, the motor counter-electromotive force may be fixed at any desired value, the motor operating at a corresponding speed. While any suitable arrangement may be used for controlling the excitation of the auxiliary generator, I have illustrated a resistor in the field circuit, controlled by a set of sequentially operated adjustable time-element relays, thus providing a time-limit acceleration and deceleration control for the motor.

Other objects of my invention will become evident from the following detailed description, taken in conjunction with the accompanying drawing, in which the single figure is a diagrammatic view of a system of control organized in accordance with the present invention.

Referring to the drawing, the apparatus shown therein comprises a main generator G and an exciter E mounted on a common shaft with any suitable driving means DM. The armature of the main generator G is connected in a loop circuit with the armature of a motor M, the operation of which is to be controlled, and the series field winding 1s of an IR correction generator 1. A pair of supply conductors 2 and 3 are connected to the terminals of the exciter E to be energized therefrom.

The separately excited field winding GF of the main generator G is arranged to be connected to supply conductors 2 and 3 in series with a field-forcing resistor r1 and a resistor r2 by a pair of reversing switches 4 and 6 for one direction of motor travel; or by a second pair of reversing switches 5 and 7 for the opposite direction of motor travel. The pairs of reversing switch 4, 6 and 5, 7 also control the direction of current through a circuit comprising the separately excited field winding 8f of an auxiliary generator 8 and a resistor r3. The separately excited field winding MF of motor M is connected to supply conductors 2 and 3 to be energized therefrom.

The armature of the IR correction generator 1 is mounted on a common shaft with the armature of the auxiliary generator 8 and a second driving means dm. It will be understood that machines G, E, 8 and 1 must all be driven at substantially constant speed. While I have illustrated machines G and E mounted on one shaft and machines 1 and 8 mounted on a different shaft, this is a matter of expediency only, machines G and E being much larger than machines 1 and 8. I regard any arrangement by which the machines G, E, 1 and 8, or equivalents, are driven at substantially constant speed as within the purview of my invention. The armature of the IR correction generator 1 is connected in a circuit which includes the armature of auxiliary generator 8, the armature of motor M and the windings $e$ and $j$ of a regulator 9, (to be hereinafter more fully described).

A manual controller 10 is arranged to selectively complete energizing circuits for the operating coils of reversing switches 4 and 6 or of reversing switches 5 and 7, depending upon the direction of motor rotation desired, and to thereafter complete an energizing circuit for an accelerating relay 11. The relay 11 is the initial relay of a set of time-element relays 11, 12, 13, 14, 15, 16, each arranged, upon closure, to short circuit a section of resistor $r2$ and a section of resistor $r3$, and each, except the last relay (16) arranged to complete the energizing circuit for the next relay in closing sequence.

The inductance of the operating coil of each relay is so related to the resistance of the coil that an appreciable interval of time elapses after line voltage is impressed on the coil before the relay closes. A resistor $r$ is connected in parallel with the operating coil of each relay for introducing a time delay in the dropping out of the relays.

Each of the relays 11 to 16 inclusive, in addition to its operating coil, is provided with a de-magnetizing coil $w$. The de-magnetizing coils $w$ are connected, in series with a variable resistor $r4$, to the supply conductors 2 and 3. Each de-magnetizing coil $w$ produces a flux in opposition to the flux produced by the operating coil and of sufficient value to approximately overcome the residual magnetism of the relay but of insufficient value to operate the relay. By adjusting the current in the de-magnetizing coils $w$, the value of current in the operating coils necessary to operate the relays and, consequently, the time elements of the relays, may be adjusted.

While, for simplicity, I have shown six accelerating relays, it will be understood that, in practice, a larger number may be used, depending upon the number of steps desired in the acceleration and deceleration of the motor. For example, if it is desired to accelerate the motor in 2.8 seconds in fourteen steps, fourteen relays each having a time element of approximately .2 seconds would be used. In the arrangement shown, the closing sequence of the accelerating relays is 11, 12, 13, 14, 15 and 16 and the opening sequence the same.

The regulator 9, which I prefer to use in the practice of my invention, is of the moving-coil type disclosed in a co-pending application of Walter Schaelchlin, Serial No. 221,422, filed September 23, 1927 and assigned to the Westinghouse Electric and Manufacturing Company. This regulator comprises a magnetic structure $a$, having a core $b$ and a movable armature $c$. The movable armature $c$ is pivoted at $o$ and carries a cylinder $d$, of insulating material, upon which is mounted a winding $e$.

At its free end, the movable armature $c$ carries a movable contact member $f$, arranged to engage a stationary contact member $g$ in one position, or a second stationary contact member $h$ in a second position, the space between the contact members $g$ and $h$ being sufficient to permit the movable contact member $f$ to assume a neutral position in which neither stationary contact member is engaged.

The movable armature $c$ is biased, by a tension spring $i$, to the position in which the movable contact member $f$ engages the stationary contact member $g$. A stationary winding $j$ is mounted on the core $b$, the stationary winding being inductively related to the movable winding $e$ through the magnetic structure $a$.

The contact members $f$, $g$ and $h$ are so connected in the external circuit that when movable contact member $f$ engages stationary contact member $h$, the field-forcing resistor $r1$ in series with the separately excited field winding $Gf$ is short circuited to increase the excitation of the main generator G; and when movable contact member $f$ engages stationary contact member $h$, a second field-forcing resistor $r5$ is connected in parallel with the field winding $Gf$ to reduce the excitation of main generator G.

A condenser $c1$ is connected between the contact members $f$ and $g$ for reducing sparking at the contact members, and a similar condenser $c2$, for a similar purpose, is connected between the contact members $f$ and $h$.

The resistance values of field-forcing resistors $r1$ and $r5$ is so related to the inductance of the field winding $Gf$ and the voltage between supply conductors 2 and 3 that the field current and, consequently, the voltage of generator G may be varied rapidly by the action of regulator 9 at any point in the working range.

The operation of the above described apparatus may be set forth as follows: Assuming that the driving means DM and $dm$ are in operation, and the manual controller 10 is centered,—the machines G, E, 1 and 8 are being driven at substantially constant speed; the exciter E is generating a voltage; the supply conductors 2 and 3 are energized; the reversing switches 4, 5, 6 and 7 and the accelerating relays 11, 12, 13, 14, 15 and 16 are all open; generator G and auxiliary generator 8 generate no voltage as their field circuits are open, and motor M is excited but at rest, as no voltage is impressed across its armature.

If the handle of manual controller 10 is moved to the left to its first operating position, contact segment 10s of the manual controller bridges contact member 10a and 10b, completing an energizing circuit for the operating coils of reversing switches 4 and 6. This circuit extends from supply conductor 2, through contact members 10a, 10s and 10b of manual controller 10, thence, in parallel through the operating coils of reversing switches 4 and 6, to supply conductor 3.

Reversing switches 4 and 6 close, completing circuits for the field windings Gf of generator G and 8f of auxiliary generator 8. The circuit for field winding Gf may be traced as follows: From supply conductor 2, through contact members of reversing switch 4, conductor 17, thence, in parallel, through the field winding Gf and through field-forcing resistor r5 and contact members g and f of regulator 9, to junction point 19. From this point the circuit extends, through resistor r1 and r2, conductor 18 and contact members of reversing switch 6, to supply conductor 3. The circuit for field winding 8f extends from supply conductor 2, through contact members of reversing switch 4, conductor 17, the field winding 8f, resistor r3, conductor 18 and thence, through contact members of reversing switch 6, to supply conductor 3.

The field current of generator G, being limited by field-forcing resistor r1 and resistor r2 in series with its field winding Gf, and by field-forcing resistor r5 in parallel with the winding; the voltage of generator G builds up to a low value. At the same time, the voltage of auxiliary generator 8 builds up to a considerably higher value determined by the resistance of resistor r3. As the voltage of generator G builds up, current flows through the armature of motor M and the series field winding 1s of correction generator 1, causing the motor M to turn and the correction generator 1 to generate a correction voltage equal to the IR drop of motor M.

As previously explained, this correction voltage acts in such direction in the circuit of regulator coils e and j that the combined correction voltage and the motor terminal voltage is always equal to motor counter-electromotive force. The control voltage generated by auxiliary generator 8, being higher than the motor counter-electromotive force and acting in the opposite direction in the circuit of regulator windings e and j; the voltage impressed upon these windings is equal to the difference between the control voltage and the motor counter-electromotive force.

As the control voltage builds up, this difference increases to such value that the current in the winding e, acting upon the flux produced by winding j, causes a sufficient force on the movable armature c to rotate the armature clockwise against the tension of spring i. When this occurs, the movable contact member f is disengaged from the stationary contact member g and engages the stationary contact member h, thereby disconnecting the parallel field-forcing resistor r5 and short-circuiting the series field-forcing resistor r1. The voltage of generator G now builds up rapidly, increasing the flow of current to motor M, increasing the motor torque and causing the motor to accelerate.

As the motor M accelerates, its counter-electromotive force increases, thereby decreasing the voltage applied to the coils e and j, until the force on the regulator armature decreases to such value that the tension of spring i separates the contact members f and h, re-inserting the field-forcing resistor r1 in series with the generator field winding Gf. The voltage of generator G now rapidly decreases until the counter-electromotive force of motor M falls to such a value that contact members f and h re-engage. The armature c thus vibrates, maintaining the excitation of generator G at such value that the counter-electromotive force of motor M is maintained a pre-determined amount lower than the control voltage generated by auxiliary generator 8.

As the control voltage is constant, the motor counter-electromotive force and motor speed are maintained constant. If the load on motor M increases, the regulator 9 acts to raise the voltage of generator G a sufficient amount to maintain the motor speed constant at the same value it had before the increase. Similarly, if the direction of motor torque is reversed by an overhauling load, the regulator 9 acts to decrease the voltage of generator G a sufficient amount below the terminal voltage of motor M to maintain the motor speed constant. The speed of motor M is thus held constant at a low value, regardless of the value or direction of the load.

If the handle of manual controller 10 is moved further to the left to the next operating position, contact segment 10s of the manual controller bridges contact members 10a and 10c, completing an energizing circuit for the operating coil of relay 11. This circuit extends from supply conductor 2, through contact members 10a, 10s and 10c, through the operating coil of relay 11 to supply conductor 3.

Relay 11 does not immediately respond, due to the time element of its operating coil. As the current in this coil builds up, the flux due to it builds up until it exceeds the flux of de-magnetizing coil $w$ by an amount sufficient for the force on the relay armature to overcome the relay bias. When this occurs, the relay 11 closes, short-circuiting a section of resistor $r2$ and a section of resistor $r3$ and completing an energizing circuit for the operating coil of relay 12. Relay 12 does not immediately respond, because of the time element of its operating coil.

The short-circuiting of the section of resistor 2 increases the control voltage generated by auxiliary generator 8 to a second value, the regulator 9 acting upon the excitation of generator G to increase the counter-electromotive force of motor M to a second value, the speed of motor M increasing accordingly. The regulator 9 now acts to maintain the difference between the control voltage and the motor counter-electromotive force constant, in the manner previously explained, thereby maintaining the motor speed constant, regardless of load, at a second value.

As the current in the operating coil of relay 12 builds up, it reaches a value sufficient to operate the relay, as described in connection with relay 11, and the relay (12) closes, short-circuiting a second section of resistor $r2$ and a second section of resistor $r3$ and completing an energizing circuit for relay 13. Relay 13 is delayed in closing in the manner described in connection with relays 11 and 12.

The short-circuiting of the second section of resistor $r2$ increases the voltage of auxiliary generator 8 to a third value, the motor speed rising accordingly, to a third value, where it is maintained, regardless of load, in the manner previously described. After a predetermined interval of time, relay 13 closes to short-circuit sections of resistors $r2$ and $r3$ and complete an energizing circuit for relay 14.

Relays 14, 15 and 16 are similarly operated consecutively, at predetermined time intervals, each relay, in closing, increasing the control voltage generated by auxiliary generator 8 and the speed of motor M to a successively higher value, the motor speed being maintained constant at each value independent of load.

The successive short-circuiting of sections of resistor $r3$ has no effect on the motor speed, but adjusts the excitation of generator G roughly to the value at which it will be maintained by the regulator 9, thereby reducing the duty of the regulator contact members $f$, $g$ and $h$, and prolonging the life thereof.

If the handle of manual controller 10 is now returned to its first operating position, the energizing circuit of relay 11 is broken at contact member $10c$. Relay 11 does not immediately drop out, however, as the inductive discharge of the relay-operating coil through the resistor $r$, maintains the relay closed for a predetermined period of time. When the discharge current decreases sufficiently, relay 11 drops out, re-inserting sections of resistors $r3$ and $r2$ in series with the field windings of auxiliary generator 8 and main generator G and breaking the energizing circuit of relay 12. Because of the discharge current of the operating coil of relay 12, the relay does not immediately drop out. The re-insertion of a section of resistor $r2$ decreases the voltage of auxiliary generator 8, the regulator 9 acting to decrease the counter-electromotive force and speed of motor M accordingly, the motor speed being maintained constant at its reduced value in the manner previously described.

After the expiration of a predetermined period of time, relay 12 drops out, relays 13, 14, 15 and 16 following at predetermined time intervals, each relay in dropping out reducing the speed of motor M to a lower value at which it is maintained constant, in the manner previously described.

After the speed of motor M has been reduced to its lowest value by the dropping out of relay 16, manual controller 10 may be centered to bring the motor M to rest. Upon the centering of manual controller 10, reversing switches 4 and 6 drop out, bringing the motor M to rest and restoring the system to its initial condition in preparation for further operation in either direction.

By adjusting the value of resistor $r4$, the time elements of all the relays 11 to 16 inclusive may be simultaneously adjusted, thereby adjusting the whole period of acceleration or deceleration of the motor M. By adjusting the total value of resistor $r2$, the minimum motor speed may be fixed at any desired value. By adjusting the proportion of resistor $r2$ controlled by each of the relays 11 to 16 inclusive, the maximum and intermediate speeds of the motor may be similarly fixed.

In my copending application Serial No. 428,647, filed February 15, 1930, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,650, filed February 15, 1930, I have disclosed a variable voltage motor-control system, in which the excitation of the generator supplying the work motor is controlled in accordance with the difference of voltages of a potentiometer controlled by a series of time element relays and an auxiliary generator driven by the work motor, in such manner as to eliminate the effect of load upon the speed of the work motor.

In my copending application Serial No. 428,648, filed February 15, 1930, I have disclosed a variable voltage motor-control system, in which the excitation of the generator supplying the work motor is controlled by means of a differential device responsive to differential rotation of the work motor and an auxiliary motor, in such a manner as to eliminate the effect of load on the speed of the work motor, and in which the speed and rate of change of speed of the auxiliary motor may be independently controlled.

In my copending application Serial No. 445,304, filed April 18, 1930, I have disclosed a variable voltage motor-control system, in which the excitation of the generator supplying the work motor is controlled in accordance with the counter-electromotive force of the work motor, as measured by the terminal voltage of the generator corrected for armature resistance drop, in such a manner as to eliminate the effect of load upon the speed of the work motor.

In my copending application Serial No. 471,684, filed July 30, 1930, I have disclosed an elevator system, in which the speed regulation of the elevator motor is corrected by means of a compounding arrangement and the rate of deceleration of the elevator motor is controlled by time element means, and in which a load responsive device is provided for operating upon the time element means to obtain uniform deceleration under all load conditions.

In my copending application Serial No. 547,389, filed June 27, 1931, I have disclosed a variable voltage motor-control system, in which the excitation of the generator supplying the work motor is controlled in accordance with the difference between the counter-electromotive force of the work motor and the voltage of an auxiliary generator driven at variable speed, in such a manner as to eliminate the effect of load upon the speed of the work motor.

In the present application, I do not claim the control of the generator excitation broadly in accordance with a voltage proportional to the difference between the actual speed of the motor and a predetermined control speed, as this is the subject matter of my application Serial No. 428,647, filed February 15, 1930, mentioned above.

I do not claim the control of the generator excitation to cause the speed of the work motor to follow a predetermined succession of values, each independent of load, nor the control of the generator excitation in accordance with a control voltage furnished by the specific means of a potentiometer, nor the control of a field forcing resistor broadly in accordance with the speed of the work motor, as this subject matter is covered in my copending application Serial No. 428,650, filed February 15, 1930, mentioned above.

In the present application, I do not claim the control of the generator excitation in accordance with the differential rotation of the work motor, as compared with an independently driven rotary element, as this subject matter is claimed in my copending application Serial No. 428,648, filed February 15, 1930, mentioned above.

I do not claim the control of the generator excitation broadly by means responsive to the terminal voltage of the motor and a voltage proportional to the motor armature current, nor broadly by means responsive to a voltage substantially equal to the motor counter-electromotive force, as this subject matter is claimed in my copending application Serial No. 445,304, filed April 18, 1930, mentioned above.

In the present application, I do not claim the control of the rate of change of speed of an elevator motor by means including a load responsive element for correcting the motor speed regulation, means for determining the rate of change of speed of the elevator motor, and additional load responsive means for operating upon the last mentioned means to cause the rate of change of speed of the elevator motor to be the same under all load conditions, as this subject matter is claimed in my copending application Serial No. 471,684, filed July 30, 1930, mentioned above.

I do not claim the control of the generator excitation by means responsive to the counter-electromotive force of the motor and a voltage furnished by the specific means of a control generator driven at variable speed, nor to the control of the generator excitation by means involving an auxiliary machine decelerated by the specific means of an electromagnetic brake, as this subject matter is claimed in my copending application Serial No. 547,389, mentioned above.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor-control system, a motor, a generator, electrical connections between the armatures of said motor and said generator, means for generating a voltage having a component corresponding to a desired value of speed of said motor and a component proportional to the current in said connections, and means responsive to said voltage and the terminal voltage of said motor for controlling the excitation of said generator to maintain the actual speed of said motor at said desired value, regardless of variations of load.

2. In a motor-control system, a motor, a generator, electrical connections between the armatures of said motor and said generator, means for generating a voltage having a component corresponding to a desired value of counter-electromotive force of said motor and a component substantially equal to the armature-resistance-drop voltage of said motor, and means responsive to said voltage and the terminal voltage of said motor for controlling the excitation of said generator to maintain the actual counter-electromotive force of said motor at said desired value, regardless of variations of load.

3. In a motor-control system, a motor, a generator, electrical connections between the armatures of said motor and said generator, means for generating a control voltage, means responsive to said control voltage for controlling the terminal voltage of said generator, means operating upon said first mentioned means for changing said control voltage to thereby change the terminal voltage of said generator, and means responsive to the current in said connections for varying the terminal voltage of said generator in accordance with the motor load to maintain the speed of said motor at a constant value determined by said control voltage.

4. In a motor-control system, a motor, a generator, electrical connections between the armatures of said motor and said generator, means for generating a control voltage corresponding to a desired value of counter-electromotive force of said motor, means for producing a voltage equal to the actual counter-electromotive force of said motor, and means responsive to the algebraic sum of said control voltage and said counter-electromotive force for controlling the excitation of said generator to maintain said algebraic sum at a predetermined value.

5. In a motor-control system, a motor, a generator, electrical connections between the armatures of said motor and said generator, means for generating a control voltage corresponding to a desired value of counter-electromotive force of said motor, means for producing a voltage equal to the actual counter-electromotive force of said motor, and means responsive to the difference between said control voltage and said counter-electromotive force for controlling the excitation of said generator to maintain said difference at a predetermined value.

6. In a motor-control system, a motor, a generator having a field winding, electrical connections between the armatures of said motor and said generator, a source, a field forcing resistor, conductors connecting said source, said field winding and said field forcing resistor in series, a circuit in parallel to said resistor, contact members in said circuit, means for generating a voltage having a component corresponding to a predetermined value of speed of said motor and a component proportional to the current in said connections, and means responsive to said voltage and the terminal voltage of said motor for maintaining said contact members closed while the actual speed of said motor is below said predetermined value and for opening said contact members when the actual speed of said motor exceeds said predetermined value.

7. In a motor-control system, a motor, a generator having a field winding, electrical connections between the armature of said motor and said generator, a source, a field forcing resistor, conductors connecting said source, said field winding and said field forcing resistor in series, a circuit in parallel to said field winding, contact members in said circuit, means for generating a voltage having a component corresponding to a desired value of speed of said motor and a component proportional to the current in said connections, and means responsive to said voltage and the terminal voltage of said motor for maintaining said contact members open while the actual speed of said motor is below said desired value and for closing said contact members when the actual speed of said motor exceeds said desired value.

8. In a motor-control system, a motor, a generator, electrical connections between the armature of said motor and said generator, means for generating a voltage having a control component corresponding to a predetermined value of speed of said motor and a component proportional to the current in said connections, means responsive to said voltage and the terminal voltage of said motor for controlling the excitation of said generator to maintain the actual speed of said motor at said predetermined value, regardless of variations of load, and means operating upon said first mentioned means for changing said control component to thereby change the predetermined value of speed at which said motor operates.

9. In a motor-control system, a motor, a generator, electrical connections between the armature of said motor and said generator, means for generating a voltage having a control component corresponding to a predetermined value of speed of said motor and a component proportional to the current in said connections, means responsive to said voltage and the terminal voltage of said motor for controlling the excitation of said generator to maintain the actual speed of said motor at said predetermined value, regardless of variations of load, and means operating upon said first mentioned means for causing said control component to have successively different values at the expiration of successive intervals of time whereby the speed of said motor assumes a succession of predetermined values each independent of load.

10. In a motor-control system, a motor, a generator, electrical connections between the armatures of said motor and said generator, means for generating a control voltage, means responsive to said control voltage for controlling the terminal voltage of said generator, means responsive to the terminal voltage of said generator, means responsive to the current in said connections for varying the terminal voltage of said generator in accordance with the motor load to maintain the speed of said motor at a constant value determined by said control voltage and means operating upon said first mentioned means for causing said control voltage to have successively different values at the expiration of successive intervals of time, whereby the speed of said motor assumes a succession of different values each independent of load.

11. In a motor-control system, a motor, a generator having a field winding, electrical connections between the armatures of said motor and said generator, a source, a field forcing resistor, conductors connecting said source, said field winding and said field forcing resistor in series, a circuit in parallel to said resistor, contact members in said circuit, means for generating a voltage having a control component corresponding to a predetermined value of speed of said motor and a component proportional to the current in said connections, means responsive to said voltage and the terminal voltage of said motor for maintaining said contact members closed while the actual speed of said motor is below said predetermined value and for opening said contact members when the actual speed of said motor exceeds said predetermined value, and means operating upon said first mentioned means for changing said control component to thereby change the pre-determined value of motor speed at which said contact members are opened.

12. In a motor-control system, a motor, a generator having a field winding, electrical connections between the armatures of said motor and said generator, a source, a field forcing resistor, conductors connecting said source, said field winding and said field forcing resistor in series, a circuit in parallel to said resistor, contact members in said circuit, means for generating a voltage having a control component corresponding to a predetermined value of speed of said motor and a component proportional to the current in said connections, means responsive to said voltage and the terminal voltage of said motor for maintaining said contact members closed while the actual speed of said motor is below said predetermined value and for opening said contact members when the actual speed of said motor exceeds said predetermined value, and means operating upon said first mentioned means for causing said control component to have successively different values at the expiration of successive intervals of time, whereby the speed of said motor at which said contact members open, assumes a succession of different values.

13. In a motor-control system, a motor; a main generator, electrical conductors completing a circuit including the armatures of said motor and said main generator; a control dynamo-electric machine; means for varying the voltage of said control machine, and means, responsive to the voltage of said control machine and to a voltage substantially equal to the counter-electromotive force of said motor, for controlling the excitation of said main generator to maintain the speed of said motor at values determined by the voltage of said control machine, regardless of the load on said motor.

14. In a motor-control system, a motor; a main generator; a correction generator for generating a voltage equal to the resistance drop in the armature of said motor; electrical conductors completing a circuit including the armatures of said motor and said main generator and the field winding of said correction generator; a control generator; means for varying the voltage of said control generator; electrical conductors completing a control circuit including the armatures of said motor, said correction generator and said control generator, and means, responsive to the current in said control circuit, for controlling the excitation of said main generator to maintain the speed of said motor at values determined by the voltage of said control generator, regardless of the load on said motor.

15. In a motor-control system, a motor; a main generator; a correction generator for generating a voltage equal to the resistance drop in the armature of said motor; electrical conductors completing a circuit including the armatures of said motor and said main generator and the field winding of said correction generator; a control generator; means for varying the voltage of said control generator; electrical conductors completing a control circuit including the armatures of said motor, said correction generator and said control generator, and a vibrating relay, responsive to the current in said control circuit, for controlling the excitation of said main generator to maintain the speed of said motor at values determined by the voltage of said control generator, regardless of the load on said motor.

In testimony whereof, I have hereunto subscribed my name this 11th day of April, 1930.

WILLIAM F. EAMES.